UNITED STATES PATENT OFFICE.

PRUDENCIO CASTELLANOS, OF SAN FRANCISCO, CALIFORNIA.

IMPROVEMENT IN THE MANUFACTURE OF NITRO-SULPHURIC ACID FOR MANUFACTURING NITRO-GLYCERINE.

Specification forming part of Letters Patent No. 164,260, dated June 8, 1875; application filed October 27, 1874.

CASE 1.

*To all whom it may concern:*

Be it known that I, PRUDENCIO CASTELLANOS, of San Francisco city and county, State of California, have invented a Process for Preparing Compound for the Manufacture of Nitro-Glycerine; and I do hereby declare the following description sufficient to enable any person skilled in the art or science to which it most nearly appertains to make and use my said invention without further invention or experiment.

My invention relates to a process for preparing a compound of nitric and sulphuric acids which is to be employed in the manufacture of nitro-glycerine; and by this process I am enabled to make a considerable economy of both time and material.

The acid compound is now prepared by manufacturers of nitro-glycerine by simply mixing the two acids in the liquid state in which they are met with in commerce. These acids are, in their turn, prepared separately by ordinary and well-known processes.

In my improved process I obtain the acid mixture at the time of preparing, or, rather, during the manufacture of the nitric acid, by making use of the sulphuric acid as a condensing agent of its vapors. From this there results directly the compound of these acids ready for use in the manufacture of nitroglycerine.

In order to more fully explain my process and its advantages, I will give briefly the process in common use for preparing nitric acid. A compound of nitrate of soda and sulphuric acid is introduced into a retort, where it is heated. The retort communicates with a series of vessels, which contain a little water or weak nitric acid. The reaction which takes place within the retort causes a separation of vapors of nitric acid, which are condensed within the receiving-vessels containing the water or weak nitric acid. It is well known, however, that at the beginning and end of the operation a partial decomposition of the nitric acid occurs, producing oxygen and hyponitric acid. This latter does not dissolve in water without a further decomposition, and a portion not being condensible will escape, carrying with it some of the fumes of nitric acid, which are thus lost. In my process, however, I place sulphuric acid within the condensing-vessels, instead of water or nitric acid, and this acid completely condenses and dissolves the vapors of nitric acid as they come over. The sulphuric acid also completely dissolves the hyponitric acid as they come over. The sulphuric acid also completely dissolves the hyponitric acid without decomposing it, and no vapors, either of this or of the nitric acid, are lost, and I thus effect a considerable economy of material. I also produce a mixture of the two acids ready for use in the manufacture of nitro-glycerine, and dispense with the operation of mixing the two acids as is now done. It is also well known that all manufacturers of nitro-glycerine are obliged to employ, in making the compound acid, sulphuric acid in the most condensed state possible—that is to say, at sixty-six degrees (66°)—but by my method I am enabled to substitute sulphuric acid at 62° and 63° for almost one-half of the acid at 66°, and the resulting compound will be equal in grade and quality to any compound now made with the more concentrated acid.

Having thus described my invention, what I claim, and desire to secure by Letters Patent, is—

The process of preparing a mixture of nitric ($NO_5$) and sulphuric acid ($SO_3$) for the manufacture of nitro-glycerine by condensing vaporized nitric acid in liquid sulphuric acid, as set forth.

In witness whereof I hereunto set my hand and seal.

PRUDENCIO CASTELLANOS. [L. S.]

Witnesses:
   GEO. H. STRONG,
   C. M. RICHARDSON.